United States Patent [19]

Walling

[11] 4,062,726

[45] Dec. 13, 1977

[54] NOZZLE SEAL

[75] Inventor: Gary Allen Walling, Shellsburg, Iowa

[73] Assignee: The Babcock & Wilcox Company, New York, N.Y.

[21] Appl. No.: 579,983

[22] Filed: May 22, 1975

[51] Int. Cl.² .............................................. G21C 15/22
[52] U.S. Cl. ....................................... 176/87; 176/61; 176/65
[58] Field of Search .............................. 176/61, 65, 87

[56] References Cited

U.S. PATENT DOCUMENTS

| | | | |
|---|---|---|---|
| 2,863,817 | 12/1958 | Morris | 176/87 X |
| 2,975,115 | 3/1961 | Wigner et al. | 176/87 |
| 3,269,735 | 8/1966 | Whittaker | 176/87 |
| 3,583,429 | 6/1971 | Desmarchais | 176/87 X |
| 3,633,784 | 1/1972 | Taft | 176/87 X |
| 3,812,008 | 5/1974 | Fryer | 176/87 X |
| 3,844,883 | 10/1974 | Bevilacqua et al. | 176/87 X |

Primary Examiner—Peter A. Nelson
Attorney, Agent, or Firm—J. Maguire; R. J. Edward

[57] ABSTRACT

In an illustrative embodiment of the invention, a nuclear reactor pressure vessel, having an internal hoop from which the heated coolant emerges from the reactor core and passes through to the reactor outlet nozzles, is provided with sealing rings operatively disposed between the outlet nozzles and the hoop. The sealing rings connected by flexible members are biased against the pressure vessel and the hoop, establishing a leak-proof condition between the inlet and outlet coolants in the region about the outlet nozzle. Furthermore, the flexible responsiveness of the seal assures that the seal will not structurally couple the hoop to the pressure vessel.

4 Claims, 2 Drawing Figures

NOZZLE SEAL

BACKGROUND OF THE INVENTION

1. Field of the Invention

The present invention is directed to pressure vessels and more particularly to a nuclear reactor pressure vessel nozzle seal.

2. Description of the Prior Art

The conventional nuclear reactor pressure vessel comprises a longitudinally disposed cylindrical structure, closed at both ends by a convex base and a domed roof, having reactor coolant inlet and outlet nozzles protruding therethrough. Generally, these nozzles are disposed in a plane transverse to the longitudinal axis of the vessel and angularly separated from each other. Housed within the pressure vessel structure are, among others, the nuclear core, subassemblies and a fluid coolant. Moreover, within the pressure vessel, an annular flange is formed on the inner surface thereof. The flange serves as a means for supporting the reactor core which is suspended from a distribution hoop or shell.

The distribution hoop is extended by means of a thermal shield-skirt assembly, which supports the fuel elements in the reactor core and which also serves as a hydraulic guide.

In operation, the fluid coolant, in forced circulation, enters the pressure vessel through the inlet nozzles, and flows through the annular hydraulic guide that is formed between the inner surface of the pressure vessel and the skirt. The coolant then rises through the core of the reactor whereupon it is discharged from the vessel through an outlet nozzle which is in fluid communication with the hoop opening through conduit means interposed therebetween.

To insure proper circulation, it is imperative that direct communication be prevented between the incoming coolant and the discharging coolant. Toward this end, a leak proof contact between the hoop opening and the pressure vessel outlet nozzle is required. However, although a leak proof contact is necessary to prevent direct fluid communication, structural and differential thermal expansion conditions which can occur between the internal reactor structures and the pressure vessel must be considered. In general, the attendant thermal expansion precludes fixedly joining the conduit means to both the hoop and the pressure vessel wall. Therefore, a leak proof sealing means, either as part of the conduit or in substitution thereof, is required to prevent the commingling of the inlet fluid coolant and the outlet fluid coolant. Further, from a structural consideration it is desirable that the sealing means segregate the fluid coolants without structurally coupling the hoop to the pressure vessel.

In the past, a leak proof seal was established by a spring biased contact of a sealing ring or by thermal expansion contact of the conduit. In general, the thermal expansion contact seal consists of carefully and tediously machining the conduit or a ring to be attached thereto to establish a designed clearance or tolerance between the machined conduit or ring face and the pressure vessel nozzle during assembly. The leak-proof condition, however, for this thermal expansion type seal is only achieved at the elevated operating temperatures of the nuclear reactor system when thermal expansion of the hoop and conduit expand to meet the inner wall of the pressure vessel. Moreover, since the pressure vessel also expands during operation, this thermal expansion conduit-seal generally requires a material having a greater thermal expansion coefficient for the hoop and/or the conduit than the expansion coefficient of the pressure vessel, if the leak proof state is to be achieved.

The spring contact type seal, moreover, comprises a cylindrically shaped sealing member disposed within and extending from a cylindrical annular cavity concentric therewith. The sealing member is generally machined on one face of its cylindrical shape in order to nestle in close contact with, for example, the pressure vessel wall about the outlet nozzle and thereby prevent leakage therebetween. A spring disposed within the annular cavity interposed between the other face of the cylindrical sealing member and the rear wall of the cavity, or a compression ring, exerts in the axial direction the force necessary to tightly seat the sealing member against the pressure vessel wall. Moreover, to prevent leakage flow from one fluid from traveling through the annulus, between the sealing member and the annular cavity, and across the spring into communication with the other fluid, both the sealing member and the cavity are machined to exact close fitting tolerances such that the sealing member is seated in the cavity with only a very narrow annular gap therebetween. This gap, however, provides a labyrinth-like flow passage for fluid communication and therefore flow leakage is not prevented but merely reduced. Generally, however, this leakage rate is too large and the manufacturing tolerances are too stringent for this type of a seal.

Accordingly, there is a need to provide a sealing means which will prevent or at least reduce the leakage flow between the incoming and discharging coolants at all operating conditions without the stringent manufacturing tolerances, or the use of different materials having different thermal coefficients that are characterized by the prior art systems.

SUMMARY OF THE INVENTION

In accordance with the invention, a reactor pressure vessel-hoop discharge sealing means is provided which eliminates costly machining, removes the thermal expansion determination of the sealing means-pressure vessel clearance, allows a wider selection of materials for the hoop and/or sealing means and establishes a satisfactory leak proof seal in all reactor conditions, operating or during shut down, without structurally coupling the distribution hoop to the pressure vessel.

Specifically, a reactor pressure vessel-hoop discharge sealing means that has these features comprises a sealing ring connected to the hoop opening by an impervious expansion bellows.

More specifically, the discharge opening seal comprises an annular compression ring member seated in a recess about the hoop opening or a conduit extending therefrom having a sealing ring attached thereto and biased axially therefrom by an expansion bellows weldably connected to both the annular member and the sealing ring. The self actuating bellows seal is designed to insure that the sealing ring will securely contact the pressure vessel in all reactor conditions, operating or not, without structurally coupling the hoop to the pressure vessel. Furthermore, the impervious expansion bellows seal weldably connected to the sealing ring and the annular compression ring provides a boundary across which and around which fluid communication is prevented. Moreover, the machining costs of close tolerance members as found in the prior art thermal expansion and spring type seals are eliminated by this bellows spring system. In addition, this bellows seal design may be remotely assembled by attachment to the hoop prior to the hoop's insertion within the vessel.

The various features of novelty which characterizes the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE PREFERRED EMBODIMENTS OF THE INVENTION

For a more complete appreciation of the invention, attention is invited to the following description of an illustrative embodiment of the invention, as shown in the attached drawings.

Figure 1:
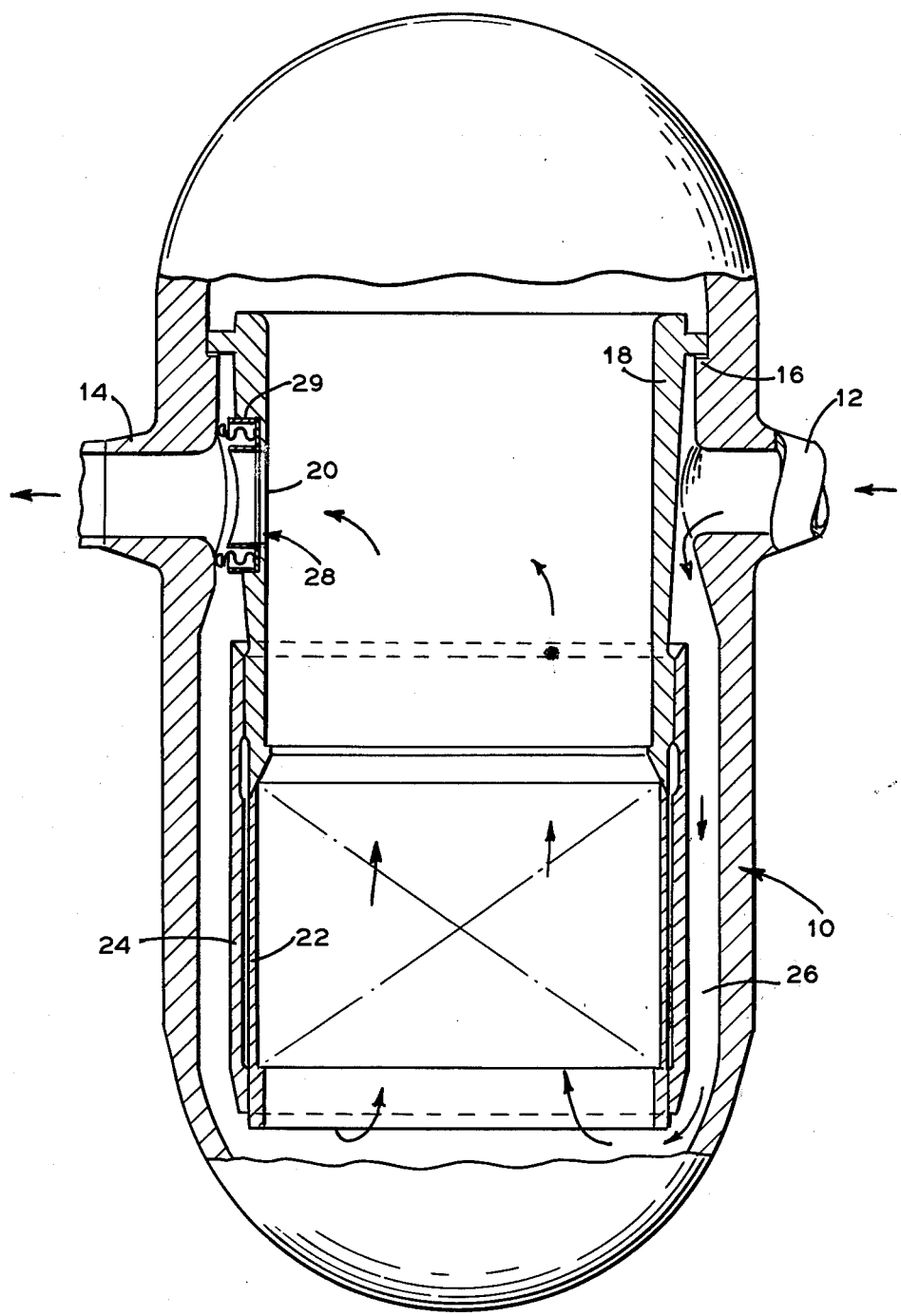
FIG. 1 shows an illustrative nuclear reactor pressure vessel in full section embodying principles of the invention.

In FIG. 1 there is illustrated a nuclear reactor pressure vessel 10 which has a longitudinally disposed cylindrical envelope closed at each end by a convex base and a domed roof. Reactor coolant inlet and outlet nozzles 12 and 14 respectively, protrude from the pressure vessel 10 near the domed roof. These nozzles are generally all disposed in the same plane, that is, transverse to the longitudinal axis of the cylindrical vessel and are separated from each other with an angular displacement. An annular flange 16 formed on the inner surface of the vessel 10 serves as a means for supporting a distribution hoop 18. The hoop 18 has an opening 20, for reactor coolant discharge, which is aligned with the outlet nozzle 14 in the vessel 10.

The distribution hoop 18 is extended by means of a skirt 22 and a thermal shield 24 which serve as a hydraulic guide for the incoming fluid coolant entering the annulus 26 formed between the hoop-skirt assembly and the pressure vessel wall from the inlet nozzle 12. Furthermore, the skirt 22 supports the fuel elements in the reactor core (not shown).

In operation, the coolant enters the pressure vessel 10 through the inlet nozzle 12 and flows downwardly through the annulus 26, rises through the reactor core (not shown) to the distribution hoop 18, whereupon the heated coolant is discharged from the vessel 10 through the opening 20 and the outlet nozzle 14.

Figure 2:
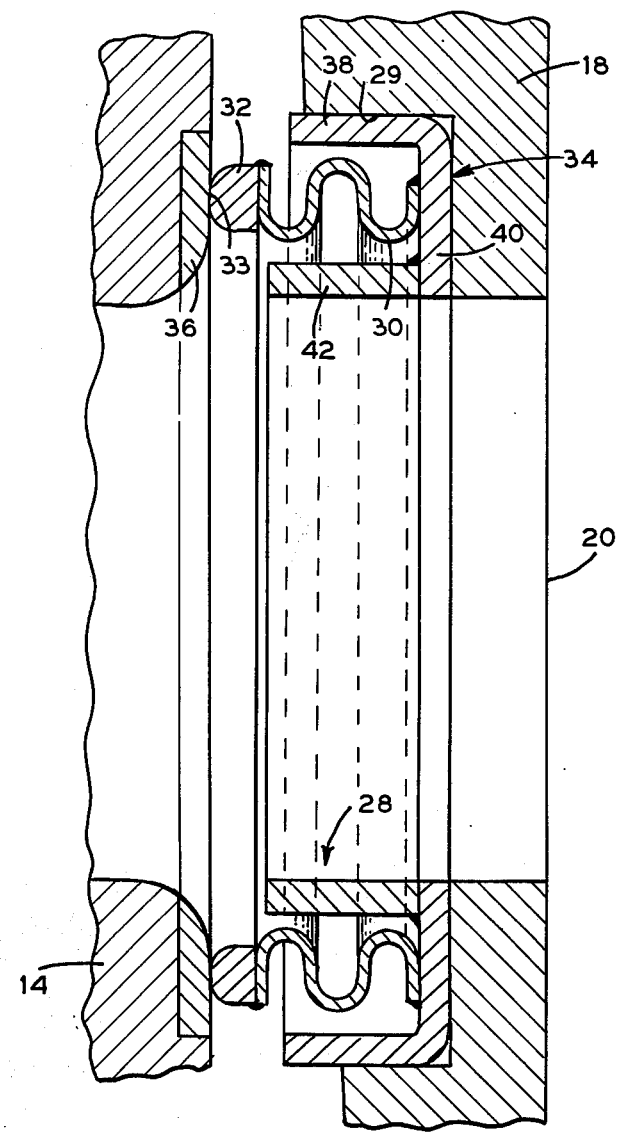
FIG. 2 is an enlarged view of a portion of a nuclear reactor pressure vessel embodying principles of the invention.

As shown in FIG. 2, the outlet nozzle 14 for the vessel 10 is in alignment with the opening 20 in the distribution hoop 18. An outlet nozzle seal 28 in accordance with this invention joins the hoop 18 to the vessel 10 or, more specifically, joins the hoop discharge opening 20 to the reactor pressure vessel outlet nozzle 14. As shown, the seal 28 is disposed within a recess 29 located circumferentially about the opening 20. The seal is comprised of an expansion bellows 30 attached at one end to seal ring 32 and at the other end to a compression ring 34 or the hoop 18. The seal 28 or, more specifically, the expansion bellows 30 is designed such that, in its assembled relationship with respect to the hoop opening 20 and the vessel nozzle 14, it forces the seal ring 32 into sealing engagement with the reactor pressure vessel. Furthermore, this sealing engagement is not dependent on reactor operation or thermal expansion.

The seal ring 32 presents a broad surface 33 to engage the pressure vessel and prevent flow leakage therebetween. As shown, the pressure vessel may be cladded with a wear surface 36 to aid in the leak prevention between the seal ring and the vessel and to resist wear due to movement of the hoop-seal assembly with respect to the vessel.

The expansion bellows 30 is an impervious hollow cylindrical or annular member having a plurality of flexible convolutions circumferentially disposed about the cylindrically shaped member in order to provide the necessary resiliency so as to prevent the structural coupling of the hoop to the vessel, and also, to provide the necessary force to hold the seal ring 32 in a leak tight relationship about, for example, the vessel nozzle 14. The impervious expansion bellows wall or boundary, moreover, prevents fluid communication across the bellows as is found in other spring seal systems. Furthermore, leakage across the bellows is prevented by seal welding or circumferentially attaching, in a leakproof manner, the bellows to both the seal ring, at one end, and the compression ring or hoop at the other end. In accordance with this invention, therefore, a leakproof sealing means is provided for fluid communication from the hoop opening to the outlet nozzle.

In the embodiment of the invention shown in FIG. 2 the bellows seal is welded to a compression ring 34 disposed within the recess 29. The compression ring 34 is a cylindrical ring member having an elbow shape cross section. One arm 38 of the compression ring forms an outer protection wall for the expansion bellows spring 30, and the other arm 40 forms a support ring to which the expansion bellows is attached. Further, in this embodiment of the invention, a channel liner 42, connected to the compression ring 34, and, in particular, connected to the ring 40 forms an inner protection wall for the bellows. The compression ring 34 and the channel liner 42 form a cylindrical annular cavity as in the previous spring seal systems. However, in this system, the close tolerance machining of the sealing ring and the cavity are not required, since the bellows wall prevents flow leakage.

In addition to forming an inner protection wall which prevents excessive lateral movement of the bellows, the channel liner 42 also serves as a smooth wall flow path from the opening 20 to the nozzle 14 to reduce the flow resistance through the sealing means to the outlet nozzle.

In accordance with this invention, flow leakage between the incoming and outgoing coolant in the vicinity of the outlet nozzle 14 is prevented by the seal ring pressure vessel contact established by the self-actuating bellows, and, in addition, fluid communication across the bellows is precluded since the bellows wall provides an impervious cylindrically or annularly shaped boundary across which fluid flow is precluded.

What is claimed is:

1. A reactor system comprising a pressure vessel having at least one inlet and one outlet nozzle, a distribution hoop located within the vessel, the hoop having an opening facing the outlet nozzle, an impervious means interposed between the vessel and the hoop to define a fluid flow channel extending from the opening to the outlet nozzle, said means including a seal ring abutting the vessel and a bellows interposed between the ring and the hoop, said bellows urging the ring toward the vessel to maintain sealing contact therebetween.

2. A reactor system according to claim 1 wherein the impervious means includes a compression ring abutting the hoop and fixedly connected to said bellows.

3. A reactor system according to claim 2 wherein the compression ring includes a circular flange disposed in spaced surrounding relation to said bellows.

4. A reactor system according to claim 2 wherein the compression ring includes a circular flange disposed within said bellows in spaced relation therewith.

* * * * *